Patented Oct. 28, 1930

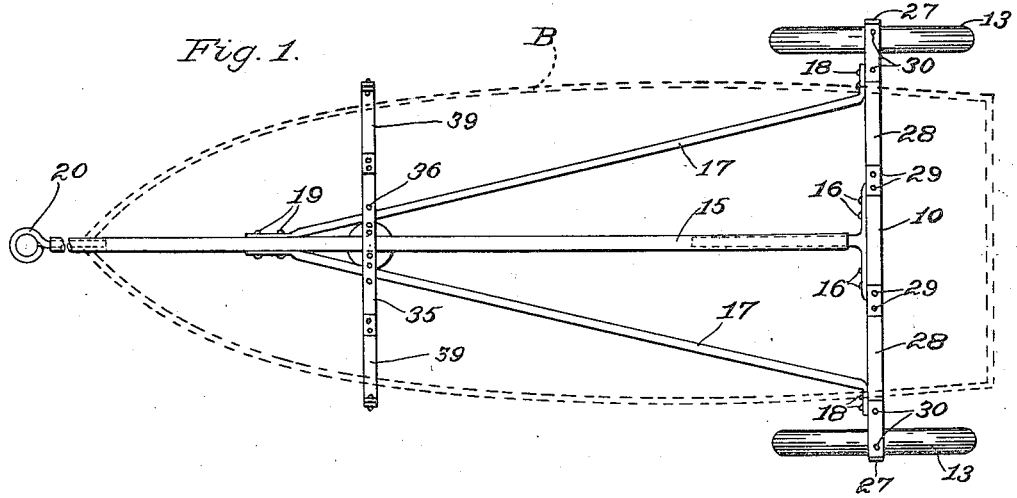
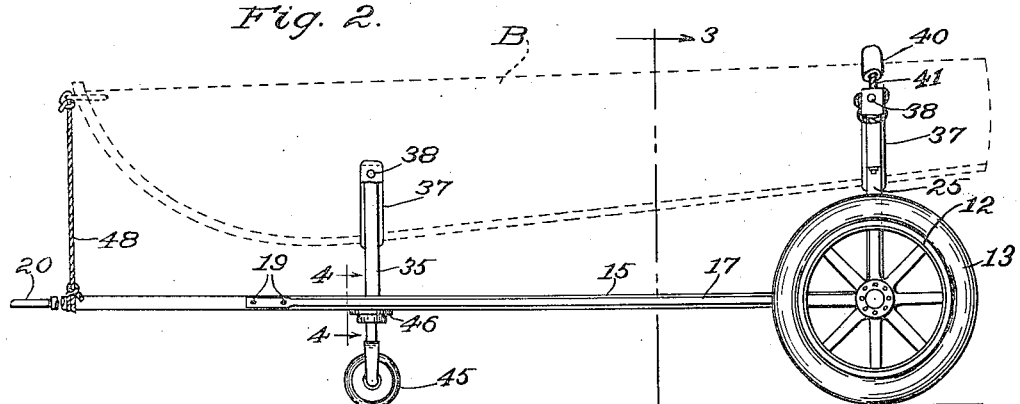
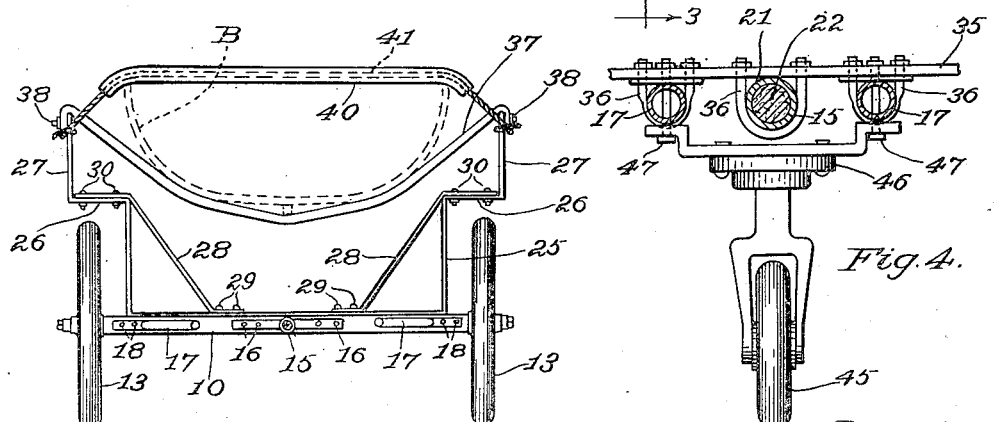
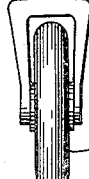

1,779,887

UNITED STATES PATENT OFFICE

PHILIP L. MELANSON, OF MELROSE, MASSACHUSETTS

TRAILER FOR VEHICLES

Application filed May 6, 1929. Serial No. 360,629.

This invention relates to devices, commonly known as trailers, especially adapted for supporting objects, such as boats, while being drawn from place to place by being fastened to the rear cross frame or other part of an automobile.

Devices of this type, suitable as trailers for automobiles, must be capable of supporting the boat or other object without injury thereto while travelling at high speeds. It has been believed essential, heretofore, to suspend the body of such trailers upon springs mounted upon the wheel axle housing of the trailer.

I have discovered, however, that a spring mounting for such devices is not essential and that devices for this purpose can be constructed without a spring mounting of any description and consequently can be manufactured at a greatly reduced cost and yet provide satisfactory support for boats and the like without injury thereto even when drawn by automobiles at high speeds.

In accordance with the provisions of the invention I provide a trailer the body of which is solidly connected to the wheel axle housing or other wheel mounting and comprises a longitudinal skeleton frame having spaced pairs of upright supports carried thereby, the boat or other object being supported during transportation by a pliable or semi-flexible member such as a piece of fire hose connecting the upper ends of each of said uprights.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

The invention will be more clearly understood from the following description in conjunction with the accompanying drawing; in which;

Fig. 1 is a plan view of the trailer of the invention;

Fig. 2 is an elevational view of the trailer;

Figure 5:
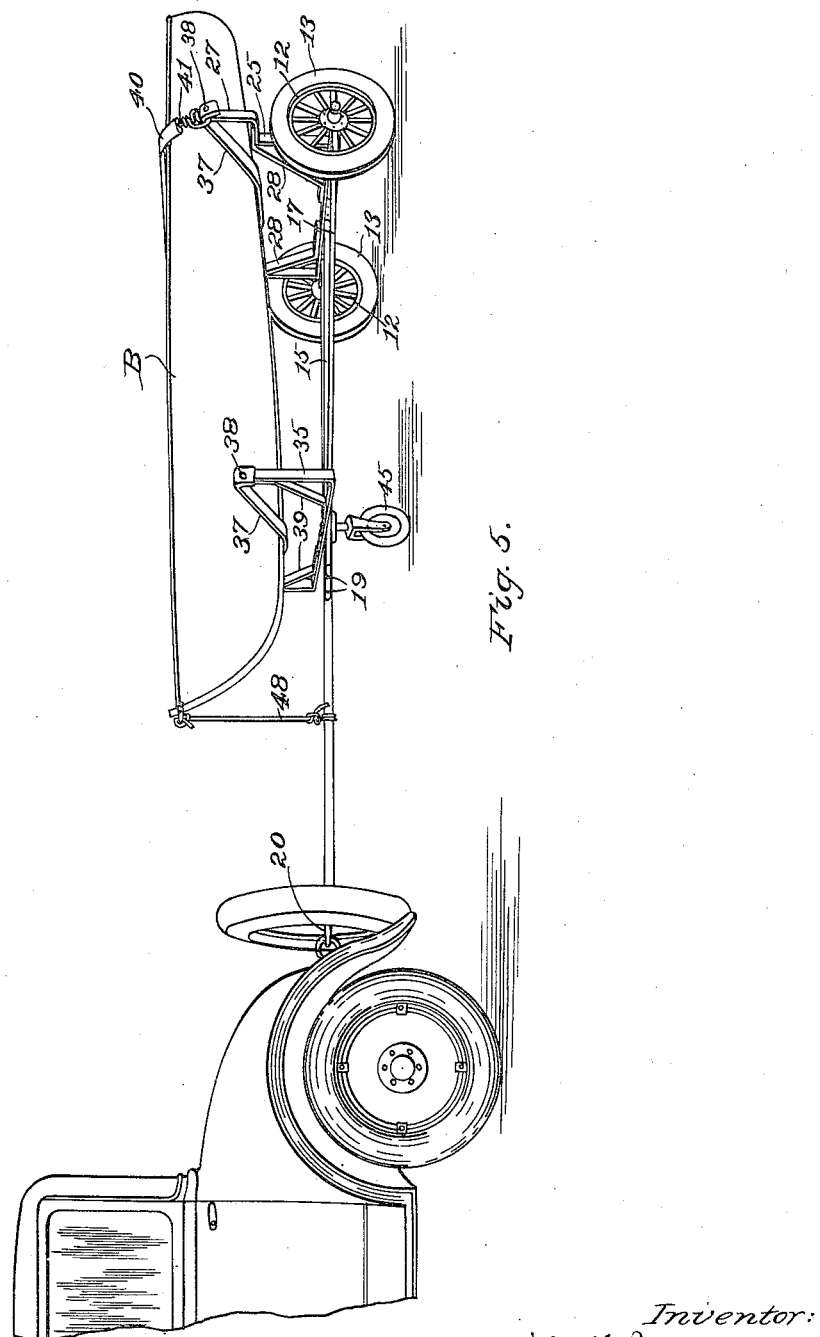

Figs. 3 and 4 are sectional views taken upon the lines 3—3 and 4—4 respectively of Fig. 2; and Fig. 5 is a perspective view showing a trailer embodying the invention attached at the rear of an automobile.

The embodiment of the invention as illustrated comprises a wheel axle 10 upon which the wheels 12 are mounted carrying pneumatic tires 13. A frame, which includes the axle 10 as a part thereof, extends longitudinally from the axle and comprises a tongue 15 secured to the axle as by bolts 16, and inclined brace members 17 each secured at one end to the axle 10, as by bolts 18, and at their other ends to the tongue 15, as by bolts 19. The tongue 15, as illustrated, comprises a metal tube 21 having a core 22 of wood to reinforce the same. The brace members 17 also are of tubular form and, if desired, may likewise be provided with a wood core. A suitable fastening device, such as an eye-screw 20 is secured to the forward end of the tongue 15 to permit the trailer to be attached to the frame or other part of an automobile to be drawn thereby. An upright support 25, preferably of U-shape, is suitably secured to the axle 10 and provided at its upper ends with outwardly and upwardy extending flange portions 26 and 27 respectively. A brace member 28 is secured at one end to the axle, as by bolts 29, and at its other end to the outwardly extending flange portion 26, as by bolts 30. A support 35, preferably of substantially U-shape, is secured, as by the U-shaped bolts or clips 36, upon the pole or tongue 15 and brace member 17 at a point spaced forwardly from the axle 10. If desired, the support 35 may be reinforced by braces 39 suitably secured thereto. A suitable pliable or semi-flexible member 37, such as a piece of fire hose, extends between the ends and is folded over the tops of the supports 25 and 35 and is secured thereto, as by bolts 38.

The pliable members 37 are adapted to receive and support a boat B or similar object which is held in place thereon by a suitable pliable member 40 held against opposite top edges thereof and which may comprise a piece of fire hose having a rope 41 inserted therethrough. The opposite ends of the rope 41 are looped under the bolts 38 and tied to the upright supports. In case it is desired to use the trailer to transport boats weighing a thousand pounds or more, I prefer to provide a forward supporting wheel 45 rotatably carried in a mounting 46 which is secured below the support 35 by the bolts 47 passing through the brace members 17 and attached to the support 35. The forward end of the boat B may be held by a rope 48 secured to the tongue 15.

It has been found that the trailer of the invention while supporting a boat may be attached to the rear of an automobile and drawn at high speed for a considerable distance without chafing or otherwise injuring the boat. Furthermore, the trailer is durable and yet of simple and low cost construction.

I claim:

1. An automobile trailer for transporting boats and the like comprising a rigid skeleton frame including a wheel axle and spaced pairs of upright supports, and a pliable semi-flexible member connecting the ends of each pair of supports and adapted to support directly thereon a boat or the like.

2. An automobile trailer for transporting boats and the like comprising a skeleton frame including a wheel axle formed as a rigid part thereof, a U-shaped support carried by said frame at a point spaced forwardly from said axle a U-shaped support carried by said axle and having an outwardly and upwardly extending flange at each end, a brace extending between the outwardly extending portions and axle, and a pliable member connecting the upper ends of each pair of supports.

3. An automobile trailer for transporting boats and the like comprising a wheel axle, a frame including a tongue extending forwardly from and secured to said axle and inclined braces each secured at one end to said axle and at their other ends to said tongue, a U-shaped support carried by said frame at a point spaced forwardly from said axle, a U-shaped support carried by said axle and having an outwardly and upwardly extending flange at each end, and a pliable member connecting the upper ends of each pair of supports.

4. An automobile trailer for transporting boats and the like comprising a skeleton frame including a wheel axle formed as a rigid part thereof, a U-shaped support carried by said frame at a point spaced forwardly from said axle, a U-shaped support carried by said axle, and a pliable member connecting the upper ends of each pair of supports.

In testimony whereof I affix my signature.

PHILIP L. MELANSON.